(12) United States Patent
Chereson et al.

(10) Patent No.: US 7,611,617 B2
(45) Date of Patent: Nov. 3, 2009

(54) METHOD OF MANUFACTURING A DIELECTRIC COMPONENT, AND DIELECTRIC COMPONENTS MANUFACTURED BY SUCH A METHOD

(75) Inventors: Jeffrey D. Chereson, Erie, PA (US); Rob Ehrensberger, Erie, PA (US); Michael Boudreaux, Houma, LA (US)

(73) Assignee: Spectrum Control, Inc., Fairview, PA (US)

( * ) Notice: Subject to any disclaimer, the term of this patent is extended or adjusted under 35 U.S.C. 154(b) by 0 days.

(21) Appl. No.: 11/685,050

(22) Filed: Mar. 12, 2007

(65) Prior Publication Data
US 2007/0285874 A1    Dec. 13, 2007

Related U.S. Application Data

(60) Provisional application No. 60/781,224, filed on Mar. 10, 2006.

(51) Int. Cl.
*C25D 5/48* (2006.01)
(52) U.S. Cl. ................ 205/223; 204/224 M; 205/151
(58) Field of Classification Search ............ 205/118, 205/122, 151, 223; 204/224 M
See application file for complete search history.

(56) References Cited

U.S. PATENT DOCUMENTS

| | | | | | |
|---|---|---|---|---|---|
| 2,769,944 | A | * | 11/1956 | Stein et al. | 361/307 |
| 3,060,114 | A | * | 10/1962 | Sanders | 204/225 |
| 3,304,475 | A | * | 2/1967 | Gowen et al. | 361/303 |
| 3,416,207 | A | * | 12/1968 | Maida | 29/25.42 |
| 3,586,933 | A | * | 6/1971 | Bonini | 361/321.2 |
| 4,000,046 | A | * | 12/1976 | Weaver | 205/103 |
| 7,022,216 | B2 | * | 4/2006 | Taylor et al. | 205/658 |
| 2004/0004006 | A1 | * | 1/2004 | Taylor et al. | 205/659 |
| 2006/0011963 | A1 | | 1/2006 | Poplett et al. | |

OTHER PUBLICATIONS

International Search Report for PCT/US07/63812, Oct. 16, 2007, Spectrum Control, Inc.
Written Opinion for PCT/US07/63812, Oct. 16, 2007, Spectrum Control, Inc.

* cited by examiner

*Primary Examiner*—Nam X Nguyen
*Assistant Examiner*—Luan V Van
(74) *Attorney, Agent, or Firm*—Hodgson Russ LLP

(57) ABSTRACT

A method of forming a dielectric component, such as a capacitor is disclosed. In such a method, a conductive surface is applied to a dielectric to form a coated dielectric. Then a portion of the conductive surface is removed from the coated dielectric to form at least two electrically isolated conductive areas.

10 Claims, 8 Drawing Sheets

FEED-THRU

Pi SECTION

TYPICAL CIRCUITS WITH SINGLE
DIELECTRIC SUBSTRATE

METHOD OF MANUFACTURING A DIELECTRIC COMPONENT, AND DIELECTRIC COMPONENTS MANUFACTURED BY SUCH A METHOD

CROSS-REFERENCE TO RELATED APPLICATION

This application claims the benefit of priority to U.S. provisional patent application Ser. No. 60/781,224, filed on Mar. 10, 2006.

FIELD OF THE INVENTION

The present invention relates to dielectric components, such as capacitors.

BACKGROUND OF THE INVENTION

A dielectric component typically has two metallized surfaces that are electrically isolated from each other by a dielectric material. In the prior art, the two metallized surfaces are created by masking a portion of the dielectric, and then the metallized layers are selectively deposited or applied. The mask prevents metallization of the dielectric. Such a process involves extensive manipulation and multiple processing of the device to produce the dielectric component.

SUMMARY OF THE INVENTION

The invention may be embodied as a method of forming a dielectric component, such as a capacitor. In one such method, a conductive surface is applied to a dielectric to form a coated dielectric. A portion of the conductive surface is then removed to form at least two electrically isolated conductive areas.

In order to coat the dielectric material, the conductive surface may be applied by electro-plating. For example, the electro-plating may be carried out by placing the dielectric material in an electrolyte, and electrically connecting the dielectric material to a voltage source in order to make the dielectric a cathode. A conductive material, such as a metal, is placed in the electrolyte, and electrically connected to a voltage source in order to make the conductive material an anode. The conductive material is then permitted to deposit on the dielectric material.

In order to remove a portion of the conductive surface, a deposition object may be placed proximate to the portion of the conductive surface to be removed. The coated dielectric may be electrically connected to a voltage source in order to make the coated dielectric an anode. The deposition object may be electrically connected to a voltage source in order to make the deposition object a cathode. The conductive surface from the coated dielectric is permitted to deposit on the deposition object. Due to the proximity of the deposition object, the portion of the conductive surface near the deposition object will be removed more quickly than other areas of the conductive surface, and when the desired portion of the conductive surface has been removed, the removal process is stopped.

A capacitor may be formed using this process. Such a capacitor has at least two electrically isolated conductive areas. As an example, one such capacitor is substantially rectangularly shaped, and has a first one of the conductive areas covering at least part of five adjacent surfaces of the dielectric material. A second one of the conductive areas may cover at least part of five adjacent surfaces of the dielectric material.

Other capacitors may have an annularly shaped dielectric material. In one such capacitor, one of the conductive areas may reside at least in part on an inner curved surface of the dielectric material. Another of the conductive areas may reside at least in part on an outer curved surface of the dielectric material. For example, a first one of the conductive areas may cover a portion of an inner curved surface of the dielectric material and also a portion of an outer curved surface of the dielectric material. A second one of the conductive areas may also cover a portion of the inner curved surface of the dielectric material and also a portion of the outer curved surface of the dielectric material.

In a further type of capacitor according to the invention, the annularly shaped dielectric component has a conductive area residing on a substantially flat portion of the dielectric material. Another of the conductive areas may reside on another substantially flat portion of the dielectric material.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

We have discovered that in order to produce a dielectric component, it is often easier to apply a single conductive coating to an unmasked dielectric component, and then remove portions of that conductive coating in order to provide two or more electrically-isolated conductive areas. Removal of portions of the conductive coating may be accomplished by an electro-chemical process. Producing a dielectric component using the invention may require mechanical, chemical, or electro-chemical application of a conductive material, such as a metal. For example, gold, silver, and/or nickel may be used as the conductive material. Although substantially all of the dielectric material may be coated with the conductive material, the invention may be used to produce a dielectric component in a more efficient manner than prior art methods. Furthermore, removal of portions of the conductive coating by an electro-chemical process not only provides electrically isolated conductive areas, but also allows for fabrication of multi-element circuits utilizing the same dielectric substrate. For example, using the invention, the following multi-element circuits may be fabricated using a single dielectric substrate: Pi, T, L, and double pi, circuits.

Figure 1:
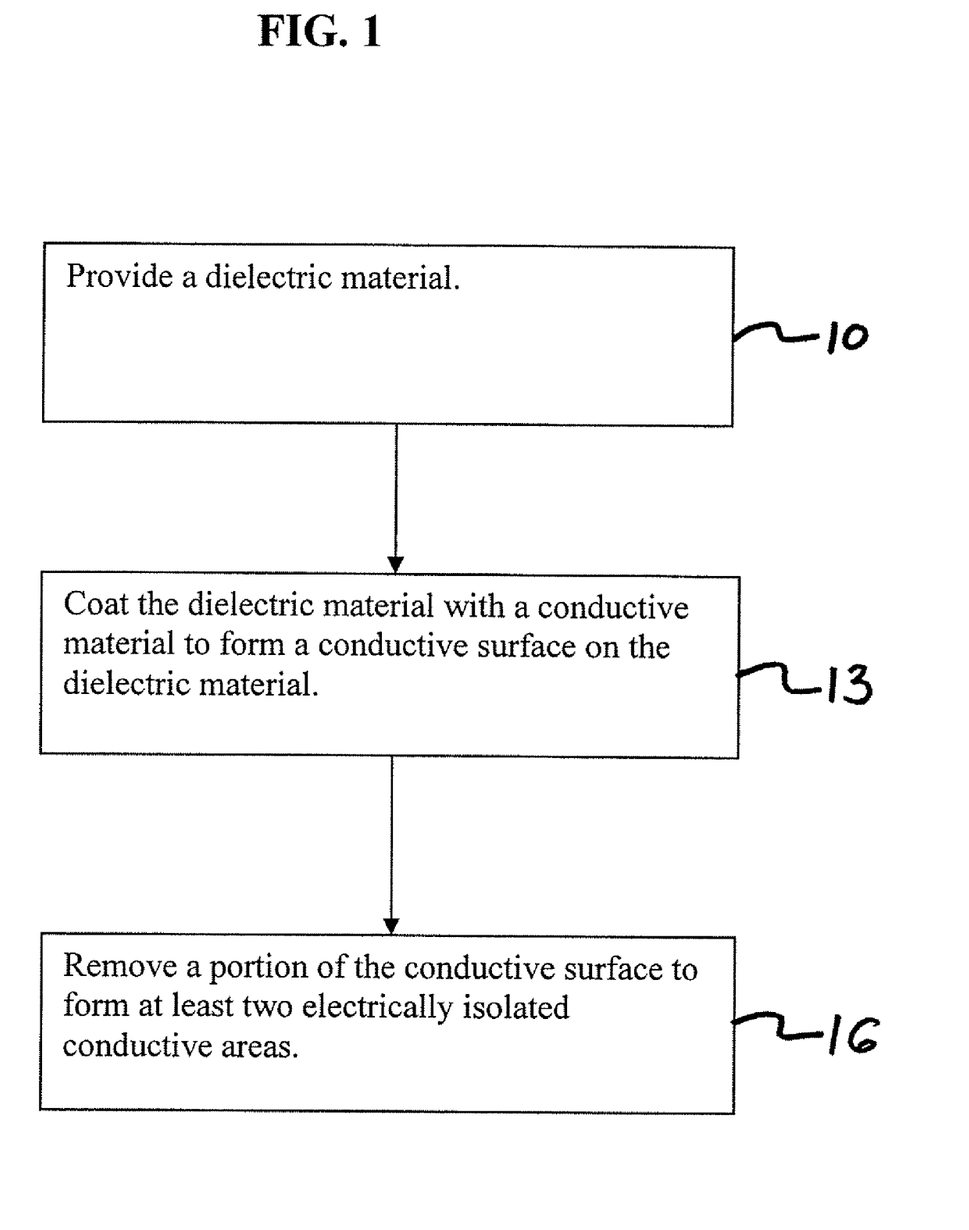
FIG. 1 is a flow diagram of a method according to the invention.

FIG. 1 depicts a method according to the invention. Initially, a dielectric material may be provided 10 and coated 13 with a conductive material, such as a metal, to provide a metal-coated dielectric material. For example, a dielectric material may be placed in an electrolyte, and the dielectric material may be electrically connected to a voltage source to make the dielectric a cathode. A metal to be deposited on the dielectric material may be placed in the electrolyte, and the metal may be electrically connected to a voltage source to make the metal an anode. With time, the metal anode will be deposited on the dielectric cathode, thereby coating the dielectric material with the metal.

The coated dielectric material may be subjected to a material removal process in which a portion of the conductive coating is removed. Such a removal process may be similar to the process that coated the dielectric, but with two important differences. First, the removal process is used on only a portion of the coated dielectric material. Second, the removal process takes part of the conductive material off the dielectric material and places it on another structure. To accomplish this, the coated dielectric material may be made the anode. Once the removal process has been completed and a portion of the coating has been removed to expose the dielectric, an electrically isolated area is created by the exposed portion of the dielectric material.

Figure 2:
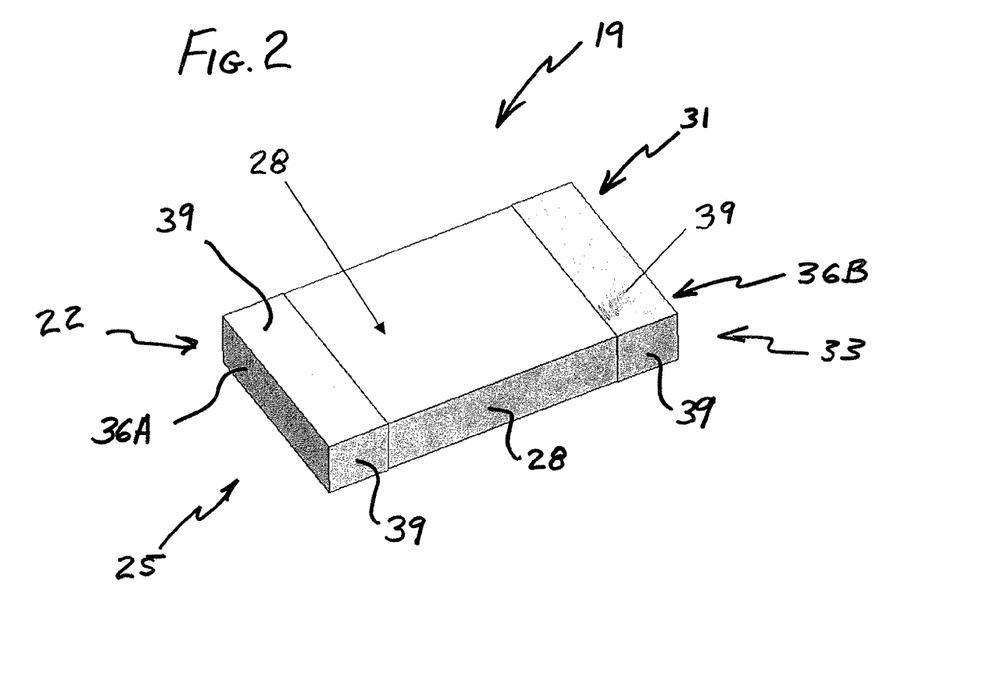
FIG. 2 is a perspective view of an example of a chip dielectric fabricated according to the present invention. The chip dielectric has a first conductive area on a first end of the dielectric and a second conductive area on a second end of the dielectric.

FIG. 2 depicts a capacitor 19 that may be formed using the method described above. In FIG. 2 there is shown a capacitor 19 that has a first conductive area 22 on a first end 25 of the dielectric 19 and a second conductive area 31 on a second end 33 of the dielectric 19. The first conductive area 22 covers an end-surface 36A of the dielectric material 28, and also part of four surfaces 39 (two of which are shown) that are adjacent to the first end-surface 36A. The second metallized area 31 covers an end-surface 36B of the dielectric material 28, and also part of four surfaces 39 that are adjacent to the second-end surface 36B.

Figure 3:
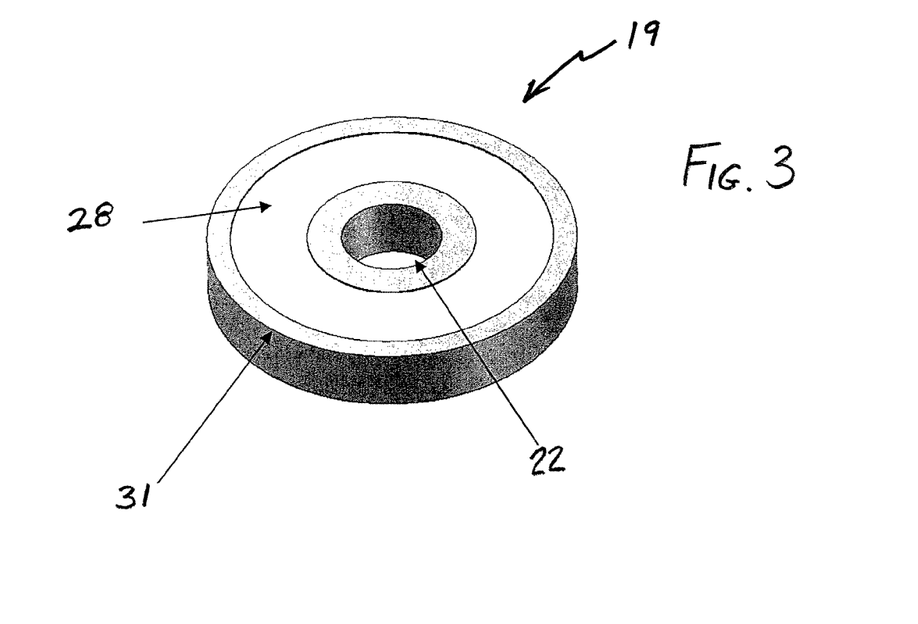
FIG. 3 is a perspective view of an example of a discoidal capacitor fabricated according to the present invention. The discoidal dielectric capacitor has an annular-shaped dielectric material, a first conductive area on an inside diameter of the dielectric material and a second conductive area on an outside diameter of the dielectric material.

FIG. 3 depicts another capacitor 19 fabricated according to the present invention. The discoidal dielectric capacitor has an annular-shaped dielectric material 28. A first conductive area 22 resides on an inside diameter of the dielectric material 28 and a second conductive area 31 resides on an outside diameter of the dielectric material 28. In FIG. 3, portions of each conductive area 22, 31 extend onto the substantially flat surfaces of the dielectric material 19.

Figure 4A:
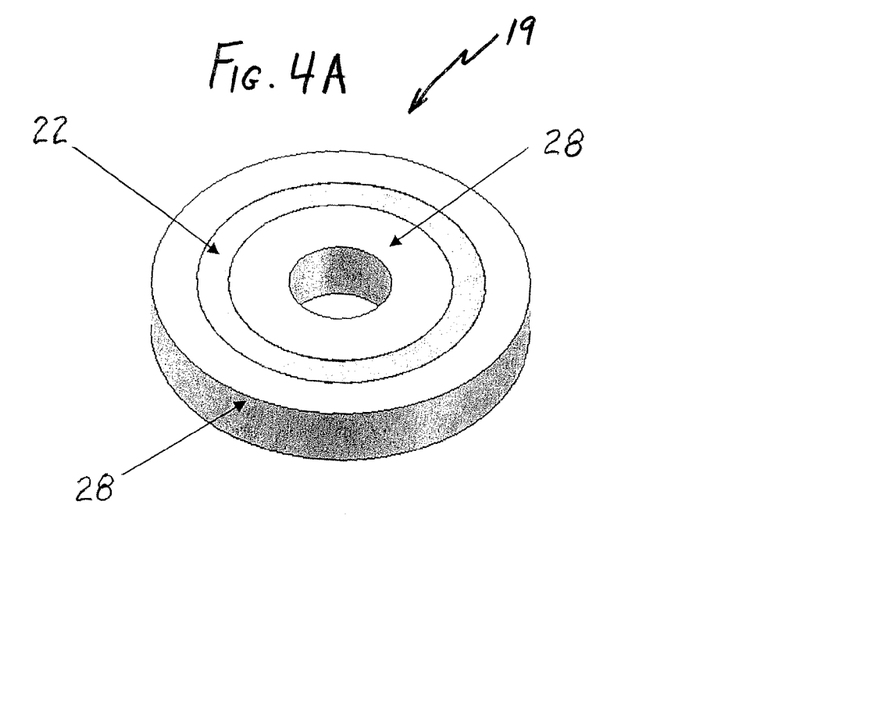
FIG. 4A is a perspective view of a disc dielectric component having two similar conductive areas, one of which is shown. The first annular conductive area resides on a first substantially flat side of the dielectric material, and a second annular conductive area resides on a second substantially flat side (not shown) of the dielectric material.
Figure 4B:
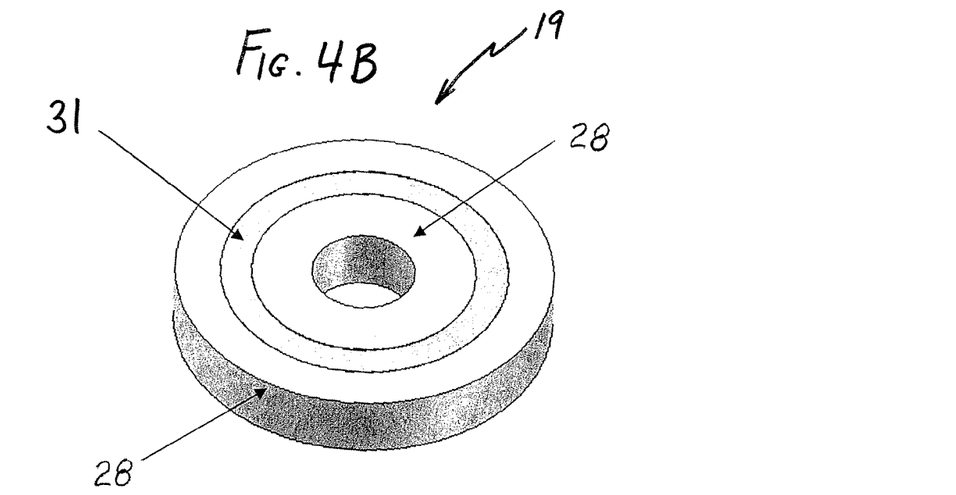
FIG. 4B is a perspective view of a different side of the dielectric component shown in FIG. 4A.

FIG. 4A depicts a capacitor 19 fabricated according to the invention. Here, an annular-shaped dielectric material 28 has two similar conductive areas. One of the conductive areas 22 is shown. The first conductive area 22 resides on a first substantially flat side of the dielectric material 28. FIG. 4B shows the second conductive area 31 on a substantially flat surface of the dielectric material 28.

Figure 5A:
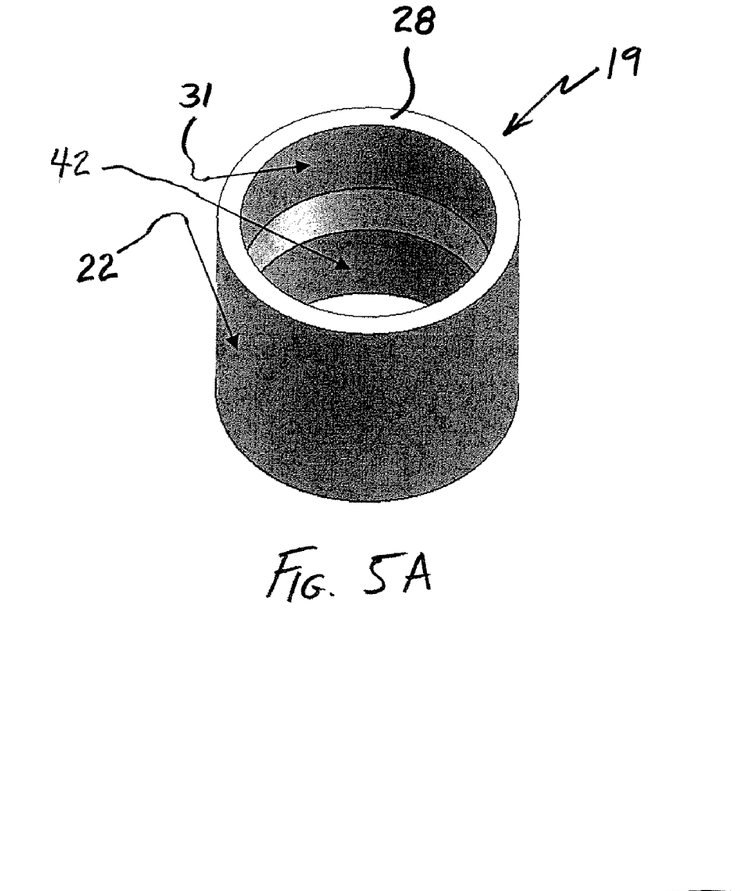
FIG. 5A is a perspective view of a tubular capacitor according to the invention.
Figure 5B:
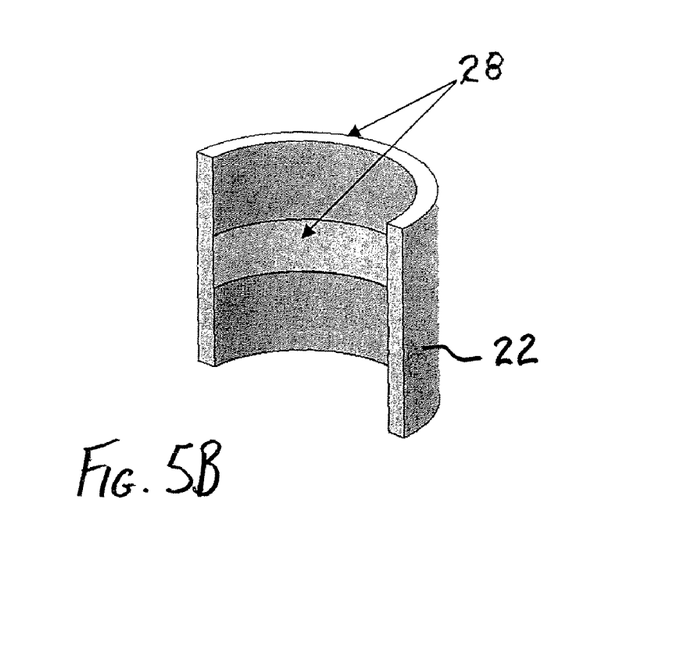
FIG. 5B is a cross-sectioned perspective view of the tubular capacitor of FIG. 5A.

FIGS. 5A and 5B depict a tubular capacitor 19. The capacitor 19 of FIGS. 5A and 5B has an annular shaped dielectric component 28, a first conductive area 22 on an outside circumferential surface of the dielectric material 28, a second conductive area 31 on an inside circumferential surface of the dielectric material 28, and a third conductive area 42 on an the inside circumferential surface of the dielectric material 28. It should be noted that the tubular capacitor 19 of FIGS. 5A and 5B has two electrically isolated conductive areas 28, 31 on the inside circumferential surface of the dielectric material 28, and one electrically isolated conductive area 42 on the outside circumferential surface of the dielectric material 28. In a variation of this tubular capacitor 19, the invention may be used to provide two electrically isolated conductive areas on the outside circumferential surface of the dielectric material 28, and one electrically isolated conductive area on the inside circumferential surface of the dielectric material 28.

Figure 6A:
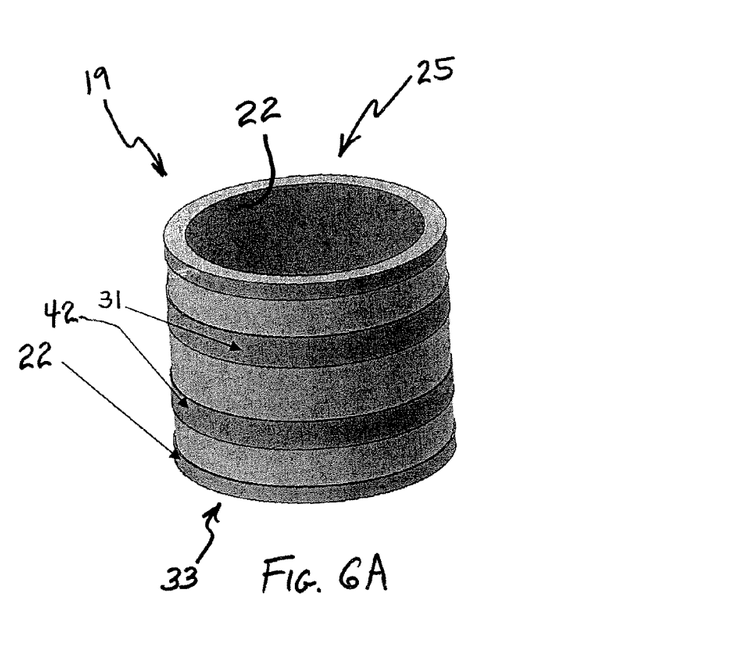
FIG. 6A is a perspective view of another tubular capacitor according to the invention.
Figure 6B:
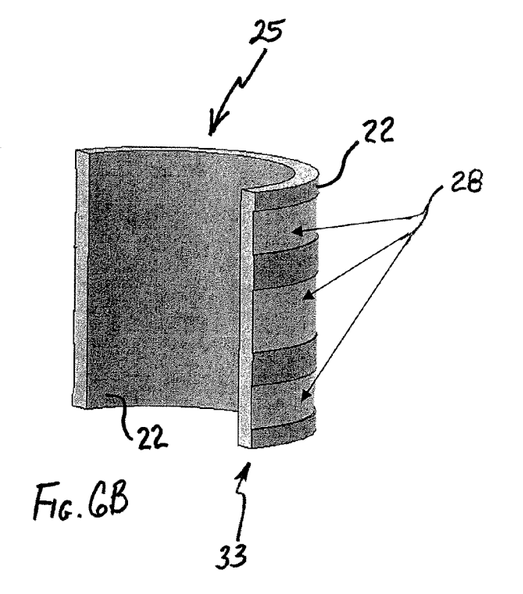
FIG. 6B is a cross-sectioned perspective view of the tubular capacitor of FIG. 6A.

FIGS. 6A and 6B depict another tubular capacitor 19. This tubular capacitor 19 has an annular dielectric material 28, a first conductive area 22 on an inside circumferential surface of the dielectric material 28, which extends over the ends 25, 33 of the dielectric material 28 and partially covers an outside surface of the dielectric material 28. On the outside circumferential surface of the dielectric material 28 are two electrically isolated conductive areas 31, 42. It should be noted that this tubular capacitor 19 provides two electrically isolated conductive areas 31, 42 on the outside circumferential surface of the dielectric material 28, and one electrically isolated conductive area 22 that is primarily but not completely on the inside circumferential surface of the dielectric material 28. In a variation of this tubular capacitor 19, the invention may be used to provide two electrically isolated conductive areas on the inside circumferential surface of the dielectric material 28, and one electrically isolated conductive area that is primarily but not completely on the outside circumferential surface of the dielectric material 28.

Figures 7A, 7B:
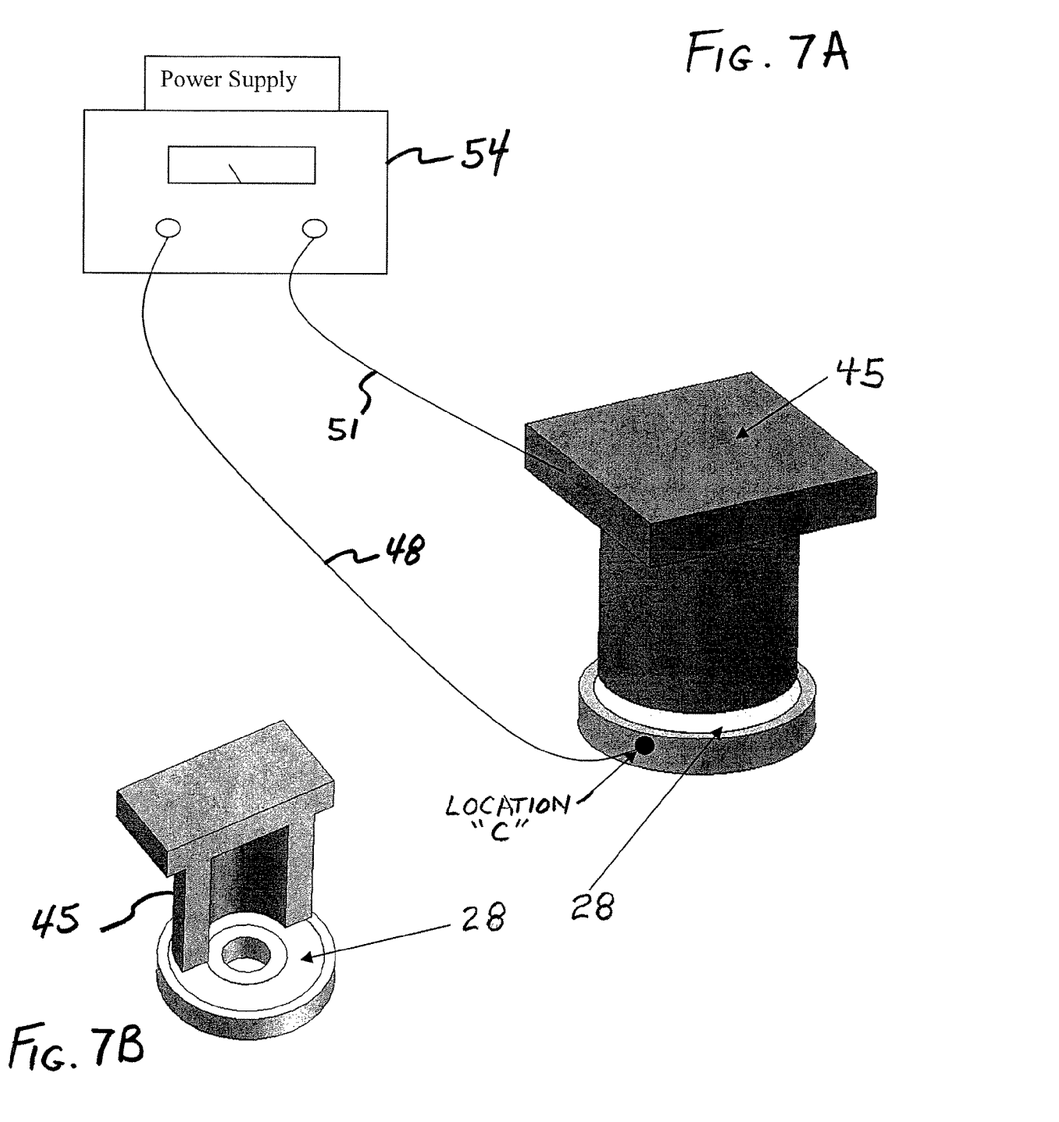
FIG. 7A is a schematic of a system that may be used to remove a portion of a conductive coating from a dielectric material to produce a discoidal capacitor like that shown in FIG. 3.
FIG. 7B is a partially cross-sectioned perspective view of part of the system shown in FIG. 7A.
Figure 8:
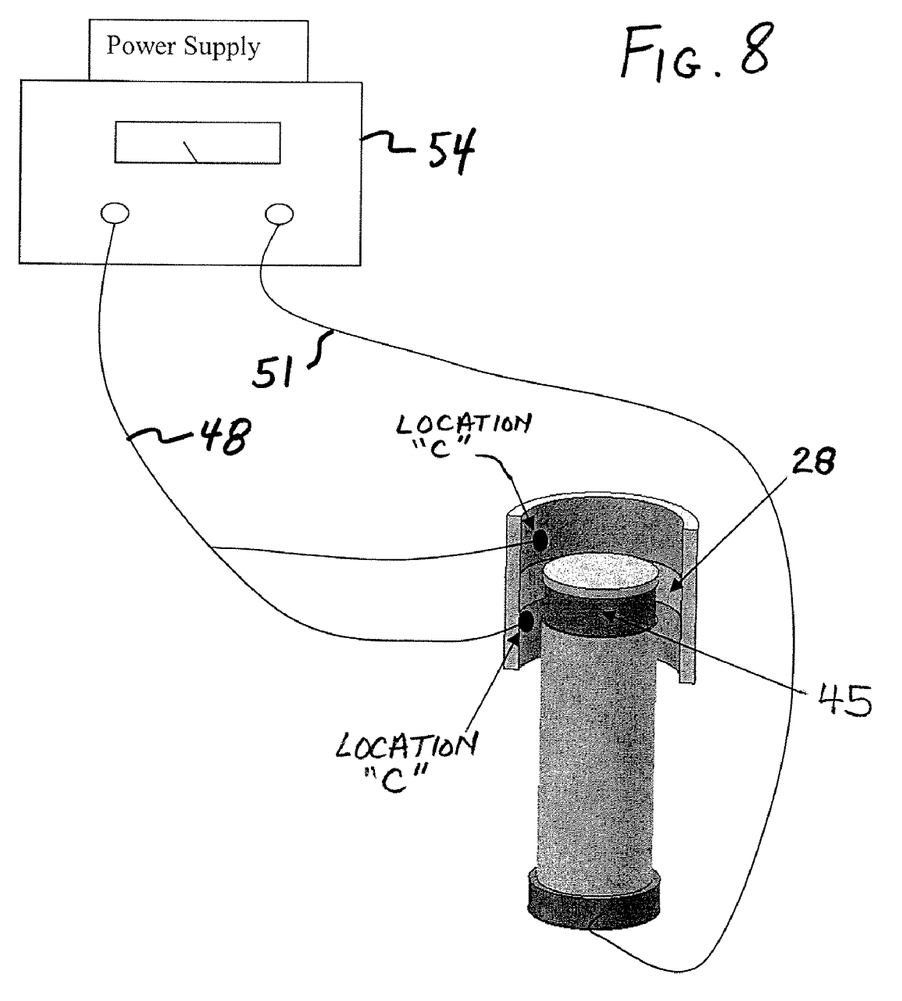
FIG. 8 is a schematic of a system that may be used to remove a portion of a conductive area from a dielectric material to produce a tubular capacitor like that shown in FIG. 5A and FIG. 5B.
Figure 9:
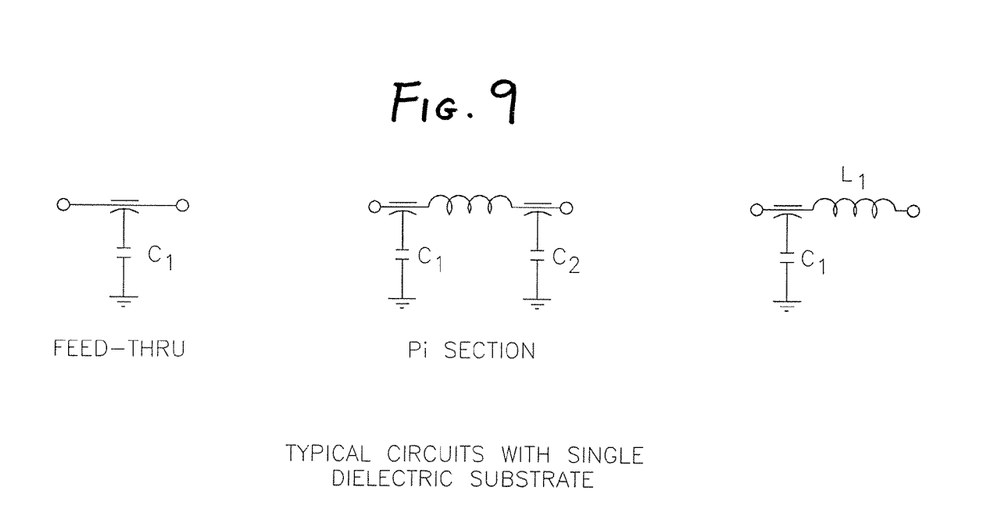
FIG. 9 schematically illustrates some of the circuits that may be produced by using capacitors made according to the invention.

FIGS. 7A and 7B depict an apparatus for forming the capacitor shown in FIG. 3. FIG. 8 depicts an apparatus for forming the capacitor shown in FIGS. 5A and 5B. With reference to FIGS. 7A, 7B and 8, a deposition object 45 may be placed proximate to the area where the metal is to be removed from the metal-coated dielectric. A first electrical conductor 48 may be connected to the metal coating, for example at location (C). A second electrical conductor 51 may be connected to the deposition object 45. The electrical conductors 48, 51 may be connected to opposite polarities of a power supply 54 so that the deposition object 45 is the cathode, and thereby cause an electric potential to exist between deposition object 45 and location C. In this manner, a portion of the metal coating will be caused to move from the dielectric material 28 to the deposition object 45. With time, all of the metal coating that is proximate to the deposition object 45 will be removed from the dielectric material 28 and deposited on the deposition object 45.

The electric potential between the deposition object 45 and location C may be influenced by the voltage/current capabilities of the power source 54, the distance between the metal coating on the dielectric material 28 and the deposition object 45, and the media present between the dielectric material 28 and the deposition object 45. Further, by adjusting these variables, the shape and rate of metal removed from the dielectric material 28 may be controlled.

The final shape of the removed metallization area may be influenced by the shape of the deposition object 45, especially in the interface area. Most of the deposition object 45 may be electrically insulated, except in the area proximate to the area on the metallized dielectric material 28 that is having metal removed (the "removal area"). The removal area will have a shape that is similar (not necessarily exact) to the cathode (uninsulated portion of the deposition object 45). The shape of the interface area of deposition object 45 together with the voltage/current being used, the distance between the metal coating on the dielectric material 28 and the deposition object 45, and the electrolytic media present between the dielectric material 28 and the deposition object 45 may each be adjusted in order to produce a desired effect.

We have found that capacitors formed by the process described herein can be made to tighter tolerances. For example, the parametric values, such as capacitance, of devices can be more accurately controlled, thereby leading to more predictable performance of the finished products, and fewer products failing to meet specifications. For example, prior art capacitors for which the target capacitance is 1000 picoFarads typically vary from that target by plus/minus 30%, but the same target capacitance using this invention could achieve tolerance of plus/minus 10%.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of forming a capacitor, comprising:
   applying a conductive surface to a curved surface of a dielectric to form a coated dielectric; and
   removing a portion of the conductive surface from the coated dielectric to form at least two electrically isolated conductive areas, wherein removing a portion of the conductive surface includes:
   placing a deposition object proximate to the portion of the conductive surface to be removed;
   electrically connecting the coated dielectric to a voltage source in order to make the coated dielectric an anode;
   electrically connecting the deposition object to a voltage source in order to make the deposition object a cathode;
   permitting a portion of the conductive surface from the coated dielectric to deposit on the deposition object.

2. The method of claim 1, wherein applying the conductive surface includes electro-plating.

3. The method of claim 2, wherein electro-plating is carried out by:
   placing the dielectric material in an electrolyte;
   electrically connecting the dielectric to a voltage source in order to make the dielectric a cathode;
   placing a conductive material in the electrolyte;
   electrically connecting the conductive material to a voltage source in order to make the conductive material an anode;
   permitting the conductive material to deposit on the dielectric material.

4. The method of claim 1, wherein the dielectric material is substantially annularly shaped.

5. The method of claim 4, wherein one of the conductive areas resides at least in part on an inner curved surface of the dielectric material.

6. The method of claim 4, wherein one of the conductive areas resides at least in part on an outer curved surface of the dielectric material.

7. The method of claim 4, wherein a first one of the conductive areas covers a portion of an inner curved surface of the dielectric material and also a portion of an outer curved surface of the dielectric material.

8. The method of claim 7, wherein a second one of the conductive areas covers a portion of the inner curved surface of the dielectric material and also a portion of the outer curved surface of the dielectric material.

9. The method of claim 4, wherein one of the conductive areas resides on a substantially flat portion of the dielectric material.

10. The method of claim 9, wherein another of the conductive areas resides on a substantially flat portion of the dielectric material.

* * * * *